United States Patent
Singh et al.

(10) Patent No.: US 12,267,255 B2
(45) Date of Patent: Apr. 1, 2025

(54) APPARATUSES AND METHODS FOR FACILITATING MANAGEMENT AND USE OF RESOURCES IN RELATION TO RESTORATION PATHS OF NETWORKS AND SYSTEMS

(71) Applicant: CIENA CORPORATION, Hanover, MD (US)

(72) Inventors: Preeti Singh, Agra Cantt. (IN); Mohit Chhillar, Delhi (IN)

(73) Assignee: CIENA CORPORATION, Hanover, MD (US)

( * ) Notice: Subject to any disclaimer, the term of this patent is extended or adjusted under 35 U.S.C. 154(b) by 36 days.

(21) Appl. No.: 18/322,692

(22) Filed: May 24, 2023

(65) Prior Publication Data
US 2024/0340254 A1 Oct. 10, 2024

(30) Foreign Application Priority Data

Apr. 6, 2023 (IN) .............................. 202311025886

(51) Int. Cl.
*H04L 47/70* (2022.01)
*H04L 41/0663* (2022.01)

(52) U.S. Cl.
CPC .......... *H04L 47/82* (2013.01); *H04L 41/0663* (2013.01)

(58) Field of Classification Search
CPC ............................ H04L 47/82; H04L 41/0663
See application file for complete search history.

(56) References Cited

U.S. PATENT DOCUMENTS

| 7,352,692 B1* | 4/2008 | Saleh | H04L 41/0668 370/395.43 |
| 8,537,836 B2* | 9/2013 | Saleh | H04L 45/22 370/395.2 |
| 9,768,870 B2* | 9/2017 | Miedema | H04L 41/12 |
| 2016/0248510 A1* | 8/2016 | Miedema | H04L 41/30 |

OTHER PUBLICATIONS

Xiao et al., "Can fine grained functional split benefit to the converged optical wireless acess networks in 5G and beyond?", IEEE Transactions on Network and Service Management, vol. 17, issue: 3, Sep. 2020.*
Tian et al., "Joint Optimization of Survivability and Enerby Efficiency in 5G C-RAN With mmWave based RRH", IEEE Access, vol. 8, May 25, 2020.*
Gao et al., "Deep Reinforcement Learning for BBU Placement and Routing in C_RAN", OSA Technical Digest, Mar. 3, 2019.*

* cited by examiner

*Primary Examiner* — Todd L Barker
(74) *Attorney, Agent, or Firm* — Guntin & Gust, PLC; Mark Wilinski (57) ABSTRACT

Aspects of the subject disclosure may include, for example, identifying criteria pertaining to at least one resource in a network, wherein the criteria include first criteria that specifies at least one service that is eligible to access the at least one resource as part of a restoration path, and based on the identifying, distributing the criteria to a node of the network that manages the access to the at least one resource by services provisioned by the network, the services including the at least one service. Other embodiments are disclosed.

20 Claims, 6 Drawing Sheets

APPARATUSES AND METHODS FOR FACILITATING MANAGEMENT AND USE OF RESOURCES IN RELATION TO RESTORATION PATHS OF NETWORKS AND SYSTEMS

CROSS-REFERENCE TO RELATED APPLICATIONS

The instant application claims priority to India Patent Application No. 202311025886 filed on Apr. 6, 2023. All sections of the aforementioned application(s) are incorporated herein by reference in their entirety.

FIELD OF THE DISCLOSURE

The subject disclosure relates to apparatuses and methods for facilitating management and use of resources in relation to restoration paths of networks and systems.

BACKGROUND

As the world increasingly becomes connected via vast communication networks and systems, and via various communication devices, there are additional opportunities generated to provision communication services to the communication devices. Managing resources associated with such services is accompanied by a host of considerations. On the one hand, a network operator or service provider may desire to provide as a high a level of quality of service (QoS), or analogously quality of experience (QoE), in respect of the provisioning of the services in an effort to ensure subscriber loyalty/use. On the other hand, efficiency in operations may dictate a reduction in resources that are used or available to facilitate such services.

As a further complexity, network and system configurations typically are not static. For example, a variety of dynamic factors or conditions may influence the provisioning of the services by the network/system resources. Such factors or conditions may include, without limitation, changes in load or traffic, impacts to channels, links or other signaling paths or associated components/devices, user/subscriber mobility, etc. Conventionally, in the event that an issue (e.g., inoperability) were to arise in the network or system along a first channel/link/path, a network operator or service provider would need to manually reconfigure the network/system, such as for example by rerouting traffic or load along a different channel/link/path, using additional resource capacity in the process. While effective at restoring services associated with the first channel/link/path, the use of the different channel/link/path may impact other channels/links/paths that were relying on an availability of the different channel/link/path in the event that the other channels/links/paths incurred an issue. Given the size or depth of modern networks and systems, practically speaking it can be difficult (if not impossible) for a network operator or service provider to effectively manage all the issues that may potentially arise in respect of resource capacity that may be available.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for managing resources that are utilized to facilitate restoration path in a provisioning of services as part of a communication network or system.

One or more aspects of the subject disclosure may include, in whole or in part, identifying criteria pertaining to at least one resource in a network, wherein the criteria include first criteria that specifies at least one service that is eligible to access the at least one resource as part of a restoration path; and based on the identifying, distributing the criteria to a node of the network that manages the access to the at least one resource by services provisioned by the network, the services including the at least one service.

One or more aspects of the subject disclosure may include, in whole or in part, obtaining first criteria that identifies at least a first service and a second service that are entitled to utilize a resource; obtaining a first request from a processing system including a processor supporting a service to utilize the resource, the first request including a first identifier of the service and a second identifier of the resource; comparing the first identifier and the second identifier to the first criteria; determining, based on the comparing, that the service corresponds to the first service and the service is entitled to utilize the resource; and based on the determining, allocating the resource to a first restoration path associated with the first service.

One or more aspects of the subject disclosure may include, in whole or in part, determining, by a processing system including a processor, that a quality of service associated with a first path between a first node and a second node of a communication system is less than a threshold, resulting in a first determination; identifying, by the processing system and based on the first determination, a resource for rerouting at least a portion of data associated with a service that utilizes the first path along a second path between the first node and the second node, wherein the resource is managed by a third node interposed between the first node and the second node; determining, by the processing system and based on the identifying, that the service is eligible to utilize the resource as part of the second path, resulting in a second determination; and causing, by the processing system and based on the second determination, the portion of the data to be routed from the first node to the second node using the second path.

Figure 1:
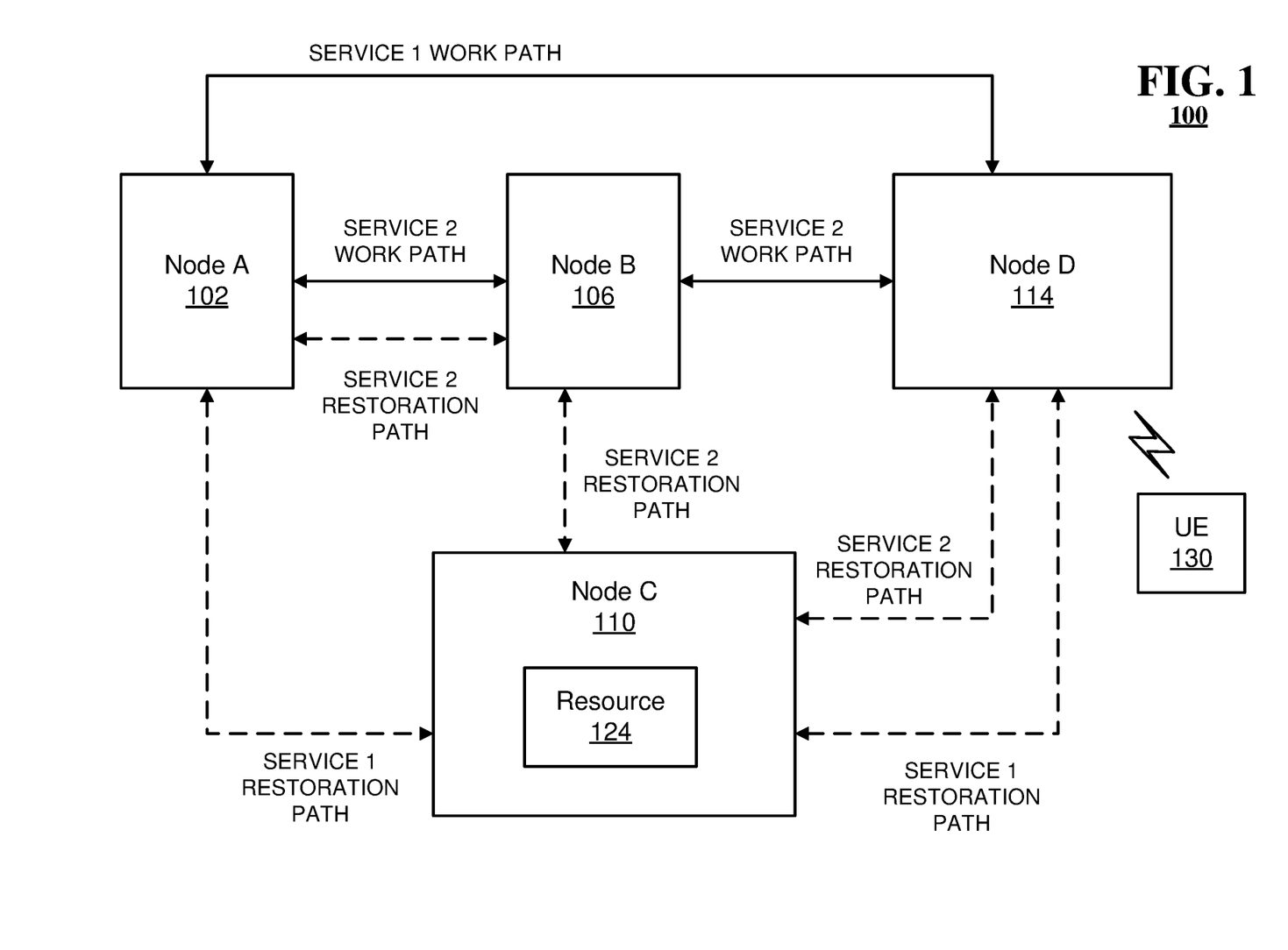
FIG. 1 is a block diagram illustrating an example, non-limiting embodiment of a system functioning in accordance with various aspects described herein.

Referring to FIG. 1, a system 100 is shown. The system 100 may be used in a provisioning of one or more communication services, as described in further detail below. In some embodiments, the system 100 may be included or incorporated as part of one or more networks. The system 100 may be operative in accordance with one or more communication protocols, standards, or the like. In some embodiments, communications in the system 100 may occur over one or more channels, links, or the like, generally referred to hereinafter as a link. A link may be implemented or embodied as a wired/wireline link, a wireless link, or a combination thereof. To demonstrate, a link of this disclosure may include or incorporate a fiber medium.

The system 100 is shown in FIG. 1 as including a number of nodes. More specifically, the system 100 may include a first node A 102, a second node B 106, a third node C 110, and a fourth node D 114. A use of four nodes is illustrative, which is to say that a given embodiment or variant of the system 100 may include more or fewer nodes. Indeed, in many practical applications of this disclosure the count/number of nodes involved in a provisioning of services (e.g., communication services) may be vastly greater than four (e.g., may include hundreds or even thousands of nodes). Each of the nodes 102 through 114 may include components or devices that may facilitate communications. For example, and without limitation, the types of components or devices that may be included as part of the nodes may include transmitters, receivers, antennas, signal conditioning components (e.g., amplifiers, signal regenerators, signal repeaters, modulators/demodulators, multiplexer/demultiplexers, frequency shifters, converters), clocks or oscillators, etc., or any combination thereof.

Potentially, the nodes 102 through 114 may be communicatively coupled to one another as part of facilitating communication services. The system 100 may be provisioned with excess capabilities/capacities to guard against inoperability of one or more components, links, etc. The amount or extent of the excess capabilities/capacities may be determined in accordance with network or system planning operations. As discussed above, a tension may exist between providing high levels of QoS or QoE on the one hand (which may drive a desire to have a large amount of excess capabilities/capacities) and efficiency on the other hand (which may drive a desire to have a small amount of excess capabilities/capacities). For reasons that will become clearer below, the excess capabilities/capacities may be represented by a resource 124 that may be included as part of the node C 110.

In an illustrative scenario, it may be assumed that the system 100 provides two services—e.g., a first service (Service 1) and a second service (Service 2). A first work path associated with Service 1 may exist between the node A 102 and the node D 114 as represented by the link(s) labeled Service 1 Work Path in FIG. 1. A second work path associated with Service 2 may exist between the node A 102, the node B 106, and the node D 114 as represented by the link(s) labeled Service 2 Work Path in FIG. 1. Under normal or nominal operating conditions, transactions associated with each of the services Service 1 and Service 2 may be executed along their respective work paths. However, due to dynamic factors or conditions (potentially including, but not necessarily limited to, changes in demand or load, inoperability of a component or link, etc.), it may be the case that a work path (or a portion thereof) becomes inoperable or degrades to extent below an acceptable level (which may be represented by one or more thresholds). In this respect, and in an effort to ensure a certain level of QoS or QoE, each of the aforementioned work paths may be associated with a counterpart restoration path. For example, the Service 1 Work Path may have a counterpart restoration path (labeled as Service 1 Restoration Path in FIG. 1) involving the node A 102, the node C 110, and the node D 114; similarly, the Service 2 Work Path may have a counterpart restoration path (labeled as Service 2 Restoration Path in FIG. 1) involving the node A 102, the node B 106, the node C 110, and the node D 114. A restoration path may potentially be used to restore at least a part/portion of a service in the event that the counterpart work path becomes inoperable or degrades below a threshold.

As indicated above, each of the restoration paths (Service 1 Restoration Path and Service 2 Restoration Path) may involve the node C 110. In particular, each of the restoration paths may potentially utilize the resource 124 in provisioning a respective service. However, it may be the case that the resource 124 only has a sufficient capacity (e.g., processing capacity, input/output capacity, etc.) to meet the demand of one of the two restoration paths (or, analogously, the associated service). In other words, it may be the case that the capacity of the resource 124 cannot simultaneously accommodate both of the restoration paths. In this regard, the resource 124 may be referred to as being "scarce" in the sense that demand for the resource 124 may exceed supply of the resource 124 under certain operating conditions or circumstances.

To address aspects of the scarcity of the resource 124, eligibility criteria may be defined to determine what/which service(s) or work path(s) is/are entitled to potentially obtain access to the resource 124. The eligibility criteria may be defined pursuant to one or more specifications, policies, rules, requirements, etc. In some embodiments, the eligibility criteria may be based on a criticality of a work path or service in respect of an application that may be executed by one or more client devices or user equipment (UE)—e.g., a UE 130 in FIG. 1 (where the UE 130 may be communicatively (e.g., wirelessly) coupled to, e.g., the node D 114). For example, levels of criticality may be assigned or defined as part of the eligibility criteria to distinguish or differentiate between first entities (e.g., applications, services, etc.) that should be entitled to access or use resources relative to second entities that should not be so entitled.

In some embodiments, a controller, a head-end, or a given node (e.g., the node A 102) may be responsible for selecting the criteria and/or distributing the criteria to another node (e.g., the node C 110) that may oversee, manage, or regulate a use of the resource 124. The another node (the node C 110 in this example) may be responsible for enforcing any criteria that it obtains/receives. In some embodiments, services or work paths may be associated with an identifier, an address, or the like that may distinguish a given service or work path from other services or work paths. In this respect, the eligibility criteria may specify those identifiers, addresses, etc., that are eligible to utilize/access the resource 124 (e.g., as a form of a whitelist). Alternatively, or additionally, the eligibility criteria may specify those identifiers, addresses, etc., that are ineligible to utilize/access the resource 124 (e.g., as a form of a blacklist). In some embodiments, access to a resource (e.g., the resource 124) may be administered on a first-come-first-serve basis amongst eligible entities that may vie for the resource. For example, and assuming that the first service work path (Service 1 Work Path) becomes degraded (e.g., inoperable) at a first point in time, and assuming that the resource 124 is not occupied/allocated at the first point in time, the resource 124 may be allocated for use in conjunction with the first restoration path (Service 1 Restoration Path). Thereafter, at a second point in time, it may be the case that the second service work path (Service 2 Work Path) becomes degraded. However, at the second point in time the resource 124 may still be allocated to the first restoration path (Service 1 Restoration Path). Thus, the second restoration path (Service 2 Restoration Path) may be unable to access the resource 124 at the second point in time. In response to the unavailability of the resource 124 at the second point in time, the service associated with the second service work path (Service 2 Work Path) may: (1) be forced to wait until the resource 124 is no longer needed by the first restoration path (Service 1 Restoration Path), or (2) attempt to utilize another restoration path or associated resource not shown in FIG. 1.

In the foregoing example, an occupation/allocation of the resource 124 by/to the first restoration path (Service 1 Restoration Path) at the first point in time may be conveyed to all of the nodes of the system 100, or may be conveyed to only those nodes that are eligible to potentially use the resource 124. Similarly, and assuming that the first restoration path (Service 1 Restoration Path) no longer needs the resource 124 at a third point in time (that is subsequent to the second point in time), a notification of a release of the resource 124 may be conveyed to all of the nodes of the system 100, or may be conveyed to only those nodes that are eligible to potentially use the resource 124. In some embodiments, a conveyance of the status may include an indication (e.g., an identifier, an address, etc.) of an entity that is obtaining or releasing the resource 124. By disseminating the status of the resource 124 (e.g., allocated or freed/released), the node C 110 might not be overwhelmed or burdened by requests for the resource 124 when the resource 124 is already occupied/allocated for other uses. In this manner, the responsibility of whether to issue a request for the resource 124 may be pushed out to nodes other than the node hosting the resource 124 (which, in the example of FIG. 1, is the node C 110).

In some embodiments, a priority-based scheme may be used to administer access to the resource 124. To continue the above example where the second restoration path (Service 2 Restoration Path) was unable to access the resource 124 at the second point in time due to the resource 124 having been occupied by/allocated to the first restoration path (Service 1 Restoration Path), in a variant it may be the case that the second restoration path (Service 2 Restoration Path) should be able to preempt the use of the resource 124 by the first restoration path (Service 1 Restoration Path) at the second point in time, despite the fact that the first restoration path (Service 1 Restoration Path) validly laid claim to the resource 124 first. For example, it may be the case that the second restoration path (Service 2 Restoration Path) is supporting an important communication service (e.g., voice) that may have a large impact on QoS/QoE for the UE 130, whereas the first restoration path (Service 1 Restoration Path) may be supporting a communication service (e.g., email) that may have less of an impact on QoS/QoE for the UE 130. In this respect, as part of this variant at the second point in time the resource 124 may be reallocated from the first restoration path (Service 1 Restoration Path) to the second restoration path (Service 2 Restoration Path). Priority amongst nodes, work paths, restoration paths, etc., may be administered according to criteria that may be defined, similar to the criteria described above. For example, the criteria pertaining to priority may be defined in accordance with one or more specifications, rules, requirements, policies, etc.

As set forth above, access to a resource (e.g., the resource 124) may be based on a dynamic allocation of the resource to one or more entities. A resource (which may include a signal regeneration capability, and may feature optical-to-electrical-to-optical conversion functionality in some embodiments), may be allocated/reserved for a particular entity in accordance with an on-demand framework, may be allocated/reserved pursuant to a schedule or periodically, etc. In some embodiments, a configuration or allocation of a resource may be based on control plane messaging within a network or system (e.g., the system 100). In some embodiments, a utilization or allocation of a resource may be based on a user-generated input. For example, the user-generated input may specify that a particular resource (e.g., the resource 124) be used, or may stipulate that a resource that is used be selected from a pool of particular/specified resources. In some embodiments, access to a resource may be based on characteristics or parameters of signaling operations. For example, and as one skilled in the art will appreciate, aspects of this disclosure may be applied in connection with reconfigurable optical add/drop multiplexers (ROADMs) of different types or varieties (e.g., fixed filter/flexible grid; colorless/colored; fixed direction/directionless; contentioned/contentionless, etc.).

Figure 2:
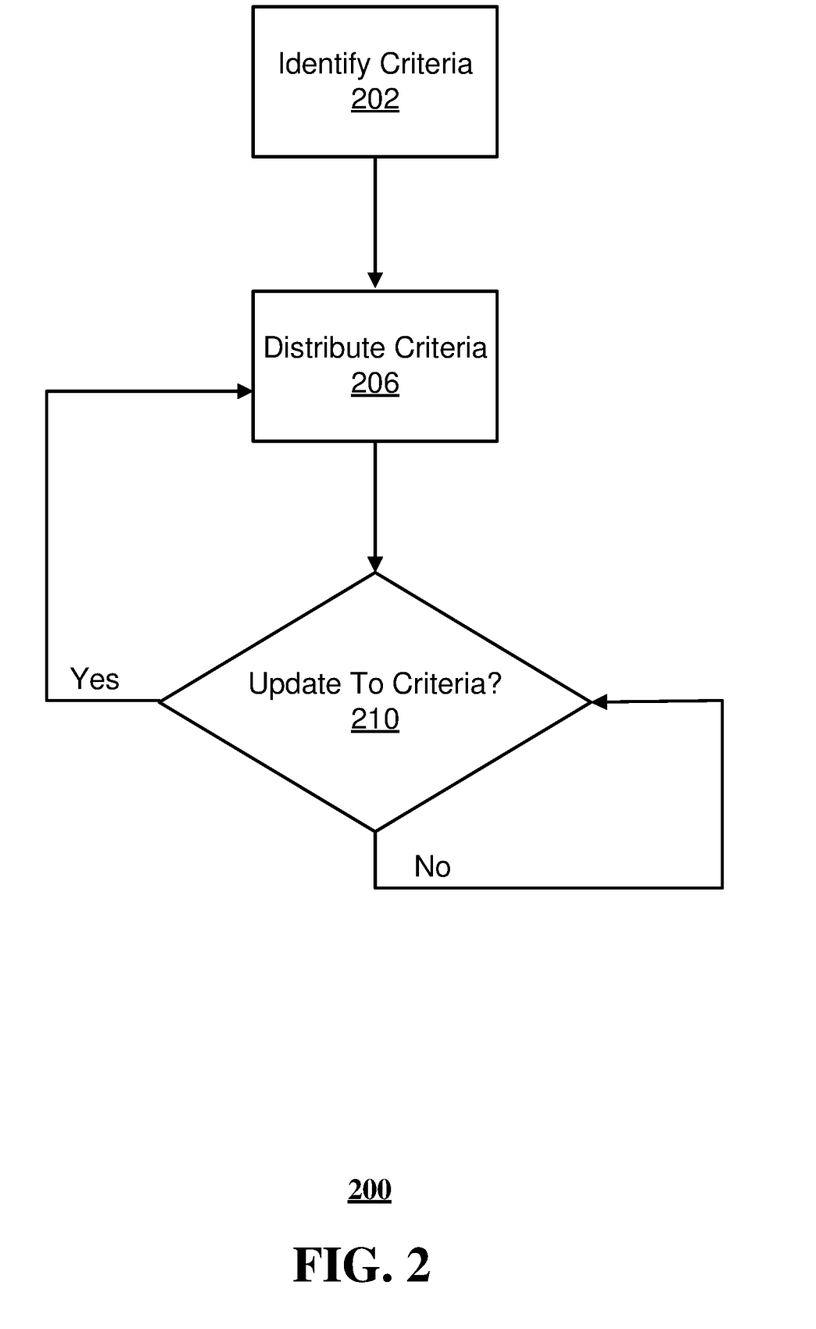
FIGS. 2 and 3A-3B depict illustrative embodiments of methods in accordance with various aspects described herein.
Figure 3A:
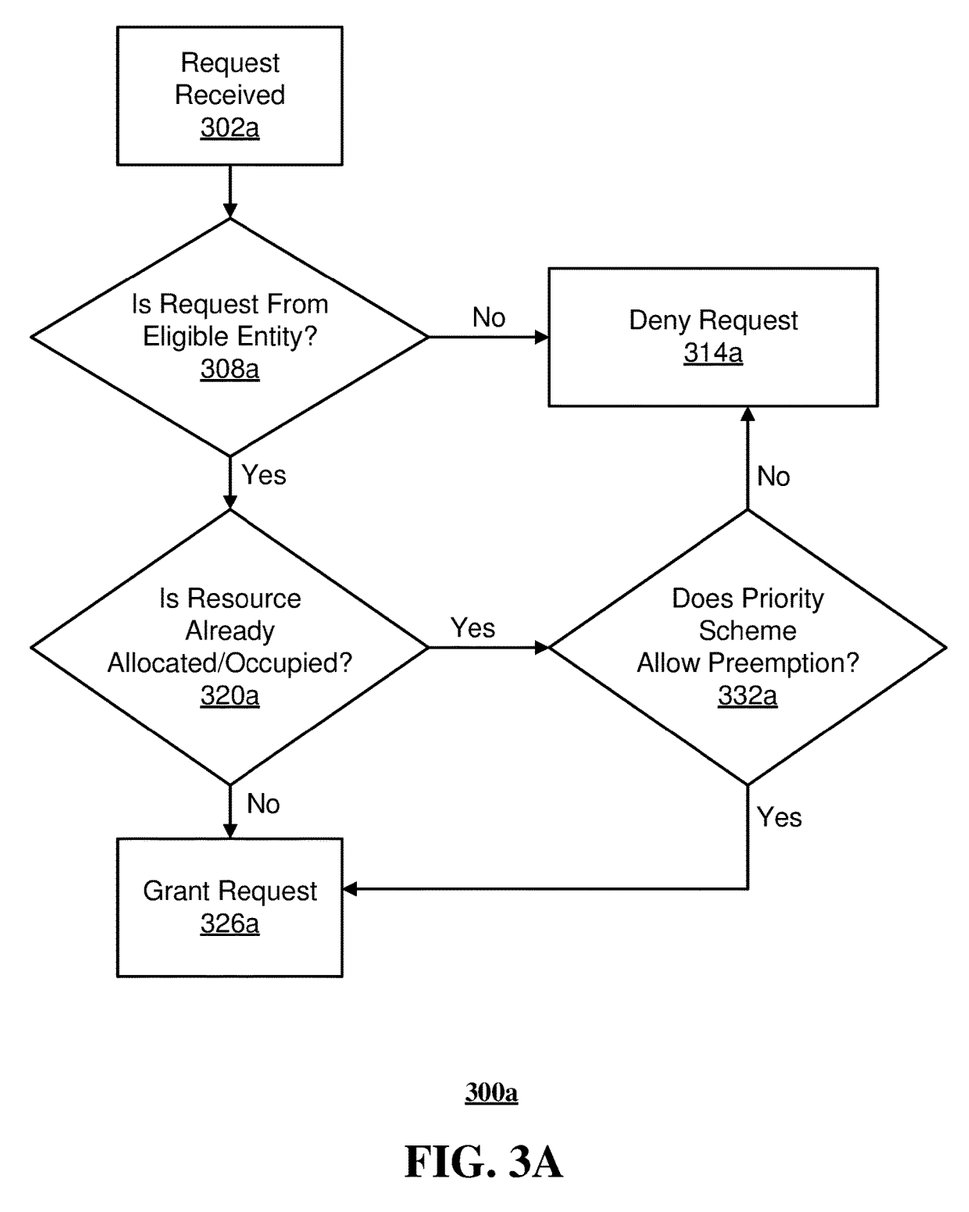
Figure 3B:
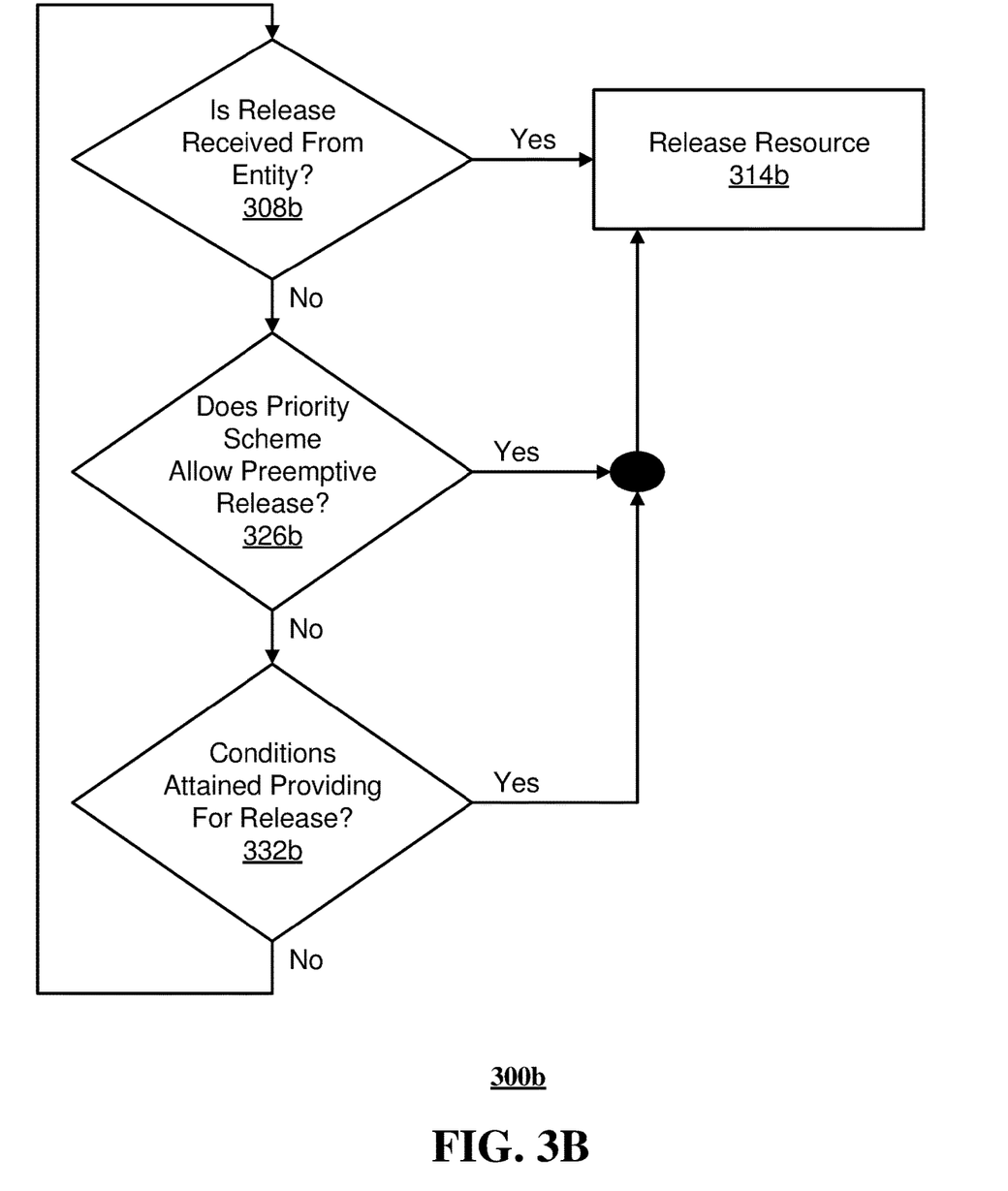

Referring now to FIGS. 2, 3A, and 3B, illustrative embodiments of methods 200, 300a, and 300b, respectively, are shown. While shown and described separately, in some embodiments one or more aspects of a first of the methods (e.g., the method 200) may be combined with one or more aspects of one or more of the other methods (e.g., the method 300a and/or the method 300b).

The method 200, the method 300a, and/or the method 300b may be implemented (e.g., executed), in whole or in part, in conjunction with one or more systems, devices, and/or components, such as for the example the systems, devices, and components set forth herein. In some embodiments, the method 200, the method 300a, and/or the method 300b may be implemented, in whole or in part, in conjunction with one or more processing systems. A processing system that may be used may include one or more processors. A processing system may execute instructions that may be stored on/in, e.g., memory to effectuate operations of the methods 200, 300a, and/or 300b.

Various operations of the methods 200, 300a, and 300b are described in further detail below in relation to the blocks of the methods 200, 300a, and 300b. It is appreciated that some of the blocks (or associated operations) may be optional in a given embodiment. Further, the blocks (or associated operations) may execute in an order or sequence that is different from what is shown in FIGS. 2, 3A, and 3B. In some embodiments, additional blocks or operations not explicitly shown may be included. Any and all of the aforementioned modifications or adaptations to the methods 200, 300a, and 300b are included as part of this disclosure.

The method 200 may be implemented to establish and disseminate criteria that may be used to control, regulate, or manage access to one or more resources. In this respect, in block 202 criteria pertaining to the resource(s) may be identified. Criteria that may be identified/established as part of block 202 may be based on one or more specifications, requirements, rules, policies, or the like. For example, the criteria may be based on QoS or QoE requirements associated with one or more services or applications. To the extent that a priority-based scheme is used to manage/regulate access to the resource(s), the criteria of block 202 may include an identification of priority amongst entities that may compete or vie for the resource(s).

In block 206, the criteria identified/established as part of block 206 may be distributed/disseminated. The distribution of block 206 may take the form of one or more messages, reports, signals, or the like. The criteria that is distributed as part of block 206 may include an identifier, an address, or the like, of any entities that may (validly) request access to the resource(s) and/or an identifier, address, or the like of the respective resource(s). Thus, a valid entry associated with the criteria may take the form of a pair of resource identifier and requesting entity identifier—e.g., resourceID.requesting_entityID. To demonstrate, Table 1 shown below includes a listing of three resources (with IDs 1 through 3) and five requesting entities (with IDs 1 through 5). As shown in the Table, the first resource may validly be accessed by the first entity or the second entity, the second resource may validly be accessed by the third entity or the fourth entity, and the third resource may validly be accessed by the second entity, the fourth entity, or the fifth entity.

TABLE 1

Valid Resource ID and Requesting Entity ID Pairs

| Resource ID | Requesting Entity ID |
|---|---|
| 1 | 1 |
| 1 | 2 |
| 2 | 3 |
| 2 | 4 |
| 3 | 2 |
| 3 | 4 |
| 3 | 5 |

In block 210, a determination may be made whether an update to the criteria is necessary or appropriate. For example, block 210 may be indicative of the fact that conditions or circumstances might not be static, but may change over time. To demonstrate, it may be the case that a new resource is added to a pool of available resources and/or that an existing resource is decommissioned or modified. Still further, aspects of services may change over time, such as for example in relation to a new or modified feature associated with a new version of a service.

To the extent that the determination of block 210 is answered in the affirmative, flow may proceed from block 210 to block 206 to distribute the updated criteria. In the event that the determination of block 210 is answered in the negative, flow may remain at block 210 to continue checking for updates to the criteria.

The method 300a may be implemented to manage requests for access to resources. For example, in block 302a a request may be received from an entity (e.g., a requesting entity). The request of block 302a may include an identifier of the entity and/or an identifier of one or more resources.

In block 308a, a determination may be made whether the request of block 302a is from a valid/eligible entity. For example, and referring to Table 1 above (see also the method 200 of FIG. 2) the determination of block 308a may be based on whether the request is from an entity that is entitled to access the resource(s). If not, flow may proceed to block 314a; otherwise, flow may proceed to block 320a.

In block 314a, the request to access to the resource(s) may be denied. The denial of block 314a may include a transmission of an indication directed to the requesting entity indicating that the request was denied. In some embodiments, the transmission may specify one or more reasons why the request was denied (e.g., not entitled to access the specified resource, resource already allocated/occupied, etc.).

In block 320a, a determination may be made whether the resource(s) is/are already allocated/occupied. For example, it may be the case that a preceding request (e.g., a request prior to the request of block 302a) has been received from, e.g., another entity, such that the resource(s) is/are unavailable. If the determination of block 320a is answered in the affirmative, flow may proceed from block 320a to block 332a; otherwise, flow may proceed from block 320a to block 326a.

In block 326a, the request of block 302a may be granted. As part of block 326a, a transmission of the status of the grant may be conveyed to the requesting entity and/or to other entities, such as for example other entities that have a right to validly claim/request the resource(s) that were the subject of the request of block 302a. To the extent that any conditions are attached to the grant (such as, for example, an expiration date or time at which the resource(s) will be automatically released), such conditions may be specified as part of the transmitted status.

In block 332a, a determination may be made whether there is a priority scheme in place that would entitle the entity that issued the request of block 302a to preempt another entity that is (currently) in possession of the resource(s). If so, flow may proceed from block 332a to block 326a; otherwise, flow may proceed to block 314a.

The method 300b may be implemented to manage, control, or regulate a release of one or more resources from an entity. In block 308b, a determination may be made whether a (request to) release is received from an entity that was previously granted access to the resource(s) (see, e.g., block 326a of the method 300a). If so, flow may proceed from block 308b to block 314b; otherwise, flow may proceed from block 308b to block 326b.

In block 314b, the resource(s) may be released. The release of block 314b may include, or be accompanied by, a transmission of the status of the release to the entity requesting the release and/or to other entities, such as for example other entities that have a right to validly claim/request the resource(s) that was/were the subject of the release.

In block 326b, a determination may be made whether a priority scheme is in place that allows for a preemptive release of the resource(s) (compare with block 332a of the method 300a). For example, in relation to block 326b it may be the case that a higher priority entity has requested access to the resource(s), such that the resource(s) should be released in favor of that higher priority entity. If the determination of block 326b is answered in the affirmative, flow may proceed from block 326b to block 314b; otherwise flow may proceed to block 332b.

In block 332b, a determination may be made whether conditions have been attained that provide for releasing the resource(s). For example, if the grant of the resource(s) to the given entity was set to expire after a predetermined timeout, and the timeout has been reached, then it may be appropriate to force a release of the resource(s). As another example of conditions that may support or warrant a release of the resource(s), if the entity that was granted the resource(s) has abused the grant in any way, it may be appropriate to force a release of the resource(s). In any event, if the conditions are such that a release is warranted, flow may proceed from block 332b to block 314b; otherwise, flow may proceed to block 308b to check (again) for a request to release the resource(s) from an entity that may currently be in possession of the resource(s).

As set forth herein, access to resources may be regulated, managed, or controlled to avoid unnecessary or excessive crankbacks. As used herein, a crankback may correspond to a procedure where setup failure information is returned from a point of failure to allow new setup attempts to be made avoiding blocked or conflicted/congested resources. Aspects of this disclosure, including a conveyance of status as part of one or more reports, messages, signals, or the like, may reduce an amount of overhead in terms of traffic that is conveyed within a network or system, which in turn may increase the efficiency of the resource utilized in the network or system.

Aspects of this disclosure may be utilized to reserve/ unreserve or allocate/deallocate a resource (or set of resources) on dynamic restoration paths. A given resource (such as pool or bank of signal regenerators) may be programmed for 1:N dynamic protection so that 'N' services can make use of the resource. Updates may automatically follow changes in a restoration path, with an ability to reserve/allocate or unreserve/release a claim to a resource. Mesh restorations may be facilitated via a control plane. The control plane functionality may be located at a centralized node or may be distributed amongst a plurality of nodes.

As set forth herein, aspects of a regeneration restoration path may include signaling or messaging. The signal or message that is conveyed may include a unique identifier that may identify one or more of: an originating node, a particular service, working spectrum, a listing of one or more (requested) resources for use by a restoration path, etc.

In some embodiments, a resource may be selectively unreserved/released by an entity that previously requested it if, for example, the entity can no longer make use of the resource. For example, and briefly referring to FIG. 1, if for whatever reason the node A 102 is unable to make use of the first service restoration path (Service 1 Restoration Path), the node A 102 may release any claim that it might otherwise have, or be able to place, on the resource 124. To demonstrate, it may be the case that a receiver of node A 102 that is associated with the node D 114 is unable to process data that it might otherwise have received from the node D 114, irrespective of the path taken between the node A 102 and the node D 114. In this respect, an allocation or use of the first resource 124 by the first service restoration path— Service 1 Restoration Path, at the potential expense of a use of the resource 124 by the second service restoration path— Service 2 Restoration Path, might be improper. To address the foregoing, the resource 124 may be released by the Service 1 Restoration Path to allow another entity (e.g., the Service 2 Restoration Path) to request an allocation/use of the resource 124.

As described herein, aspects of this disclosure may be used or implemented to generate useful, concrete, and tangible results. Aspects of this disclosure may be tied to specifically or specially programmed machines to obtain the results set forth herein. Further, aspects of this disclosure are highly transformative in nature, as a network or system, inclusive of any resources associated therewith, may be subject to a dynamic reconfiguration based on changes in conditions or circumstances.

The various aspects of this disclosure may be integrated as part of numerous practical applications. To demonstrate, aspects of this disclosure may facilitate an efficient use of network or system resources, while striking an appropriate balance with QoS or QoE requirements. Furthermore, reliability or resiliency may be enhanced, even in the face of dynamic changes in conditions or circumstances. In this respect, the various aspects of this disclosure represent substantial improvements relative to conventional technologies. Suffice it to say, the various aspects of this disclosure are not directed to abstract ideas. To the contrary, and as one of skill in the art would appreciate, the various aspects of this disclosure are directed to, and encompass, significantly more than any abstract idea standing alone.

Figure 4:
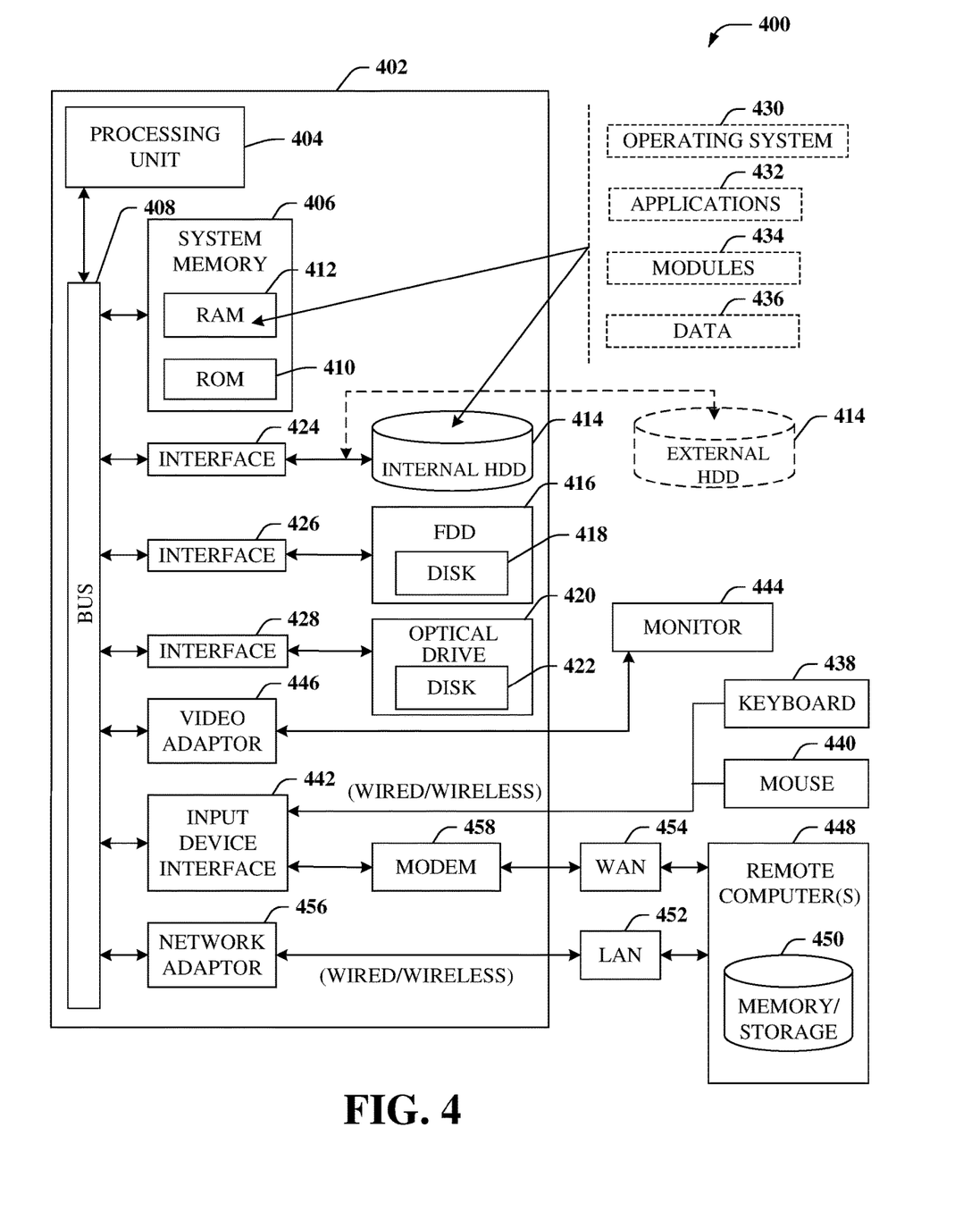
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, the computing environment 400 can be used in a communication device, a node, etc. Each of these devices can be implemented via computer-executable instructions that can run on one or more computers, and/or in combination with other program modules and/or as a combination of hardware and software. For example, the computing environment 400 can facilitate, in whole or in part, identifying criteria pertaining to at least one resource in a network, wherein the criteria include first criteria that specifies at least one service that is eligible to access the at least one resource as part of a restoration path, and based on the identifying, distributing the criteria to a node of the network that manages the access to the at least one resource by services provisioned by the network, the services including the at least one service. The computing environment 400 can facilitate, in whole or in part, obtaining first criteria that identifies at least a first service and a second service that are entitled to utilize a resource, obtaining a first request from a processing system including a processor supporting a service to utilize the resource, the first request including a first identifier of the service and a second identifier of the resource, comparing the first identifier and the second identifier to the first criteria, determining, based on the comparing, that the service corresponds to the first service and the service is entitled to utilize the resource, and based on the determining, allocating the resource to a first restoration path associated with the first service. The computing environment 400 can facilitate, in whole or in part, determining, by a processing system including a processor, that a quality of service associated with a first path between a first node and a second node of a communication system is less than a threshold, resulting in a first determination, identifying, by the processing system and based on the first determination, a resource for rerouting at least a portion of data associated with a service that utilizes the first path along a second path between the first node and the second node, wherein the resource is managed by a third node interposed between the first node and the second node, determining, by the processing system and based on the identifying, that the service is eligible to utilize the resource as part of the second path, resulting in a second determination, and causing, by the processing system and based on the second determination, the portion of the data to be routed from the first node to the second node using the second path.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
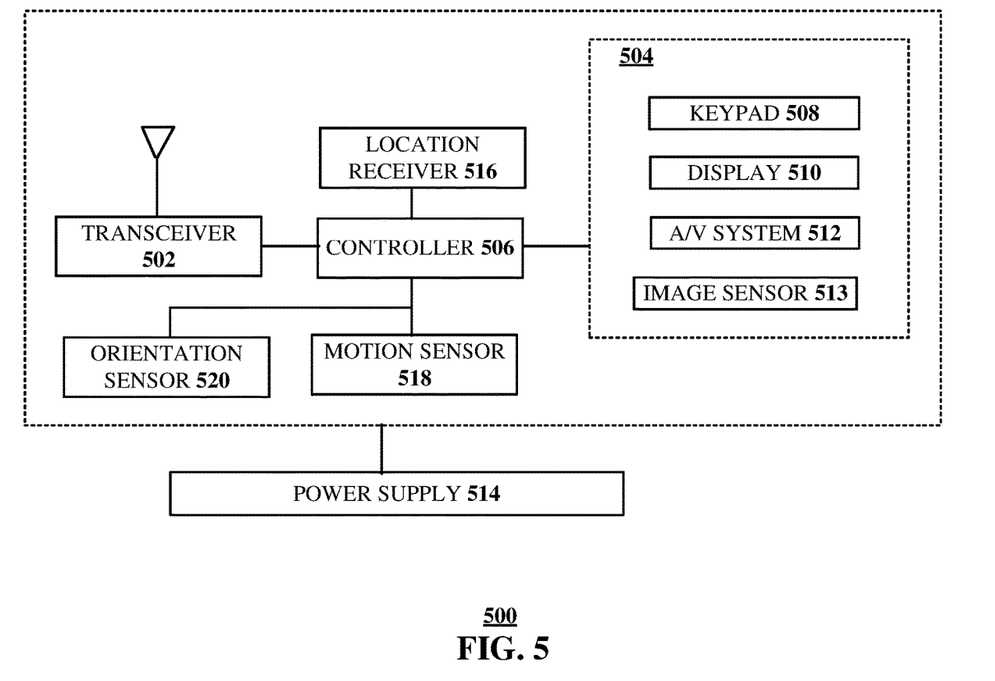
FIG. 5 is a block diagram of an example, non-limiting embodiment of a communication device in accordance with various aspects described herein.

Turning now to FIG. 5, an illustrative embodiment of a communication device 500 is shown. The communication device 500 can facilitate, in whole or in part, identifying criteria pertaining to at least one resource in a network, wherein the criteria include first criteria that specifies at least one service that is eligible to access the at least one resource as part of a restoration path, and based on the identifying, distributing the criteria to a node of the network that manages the access to the at least one resource by services provisioned by the network, the services including the at least one service. The communication device 500 can facilitate, in whole or in part, obtaining first criteria that identifies at least a first service and a second service that are entitled to utilize a resource, obtaining a first request from a processing system including a processor supporting a service to utilize the resource, the first request including a first identifier of the service and a second identifier of the resource, comparing the first identifier and the second identifier to the first criteria, determining, based on the comparing, that the service corresponds to the first service and the service is entitled to utilize the resource, and based on the determining, allocating the resource to a first restoration path associated with the first service. The communication device 500 can facilitate, in whole or in part, determining, by a processing system including a processor, that a quality of service associated with a first path between a first node and a second node of a communication system is less than a threshold, resulting in a first determination, identifying, by the processing system and based on the first determination, a resource for rerouting at least a portion of data associated with a service that utilizes the first path along a second path between the first node and the second node, wherein the resource is managed by a third node interposed between the first node and the second node, determining, by the processing system and based on the identifying, that the service is eligible to utilize the resource as part of the second path, resulting in a second determination, and causing, by the processing system and based on the second determination, the portion of the data to be routed from the first node to the second node using the second path.

The communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface having graphical user interface (GUI) elements that can be selected by a user with a touch of a finger. The display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high-volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable communications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A non-transitory machine-readable medium, comprising instructions that, when executed by a processing system including a processor, facilitate a performance of operations, the operations comprising:

identifying criteria pertaining to at least one resource in a network, wherein the criteria include first criteria that specifies at least one service that is eligible to access the at least one resource as part of a restoration path and second criteria that specifies a second at least one service that is ineligible to access the at least one resource; and based on the identifying, distributing the criteria to a node of the network that manages the access to the at least one resource by services provisioned by the network, the services including the at least one service.

2. The non-transitory machine-readable medium of claim 1, wherein the operations further comprise:

subsequent to the distributing of the criteria, determining that an update to the criteria is warranted based on an addition of a second resource to a pool of available resources, the pool of available resources including the at least one resource;

based on the determining, updating the criteria, resulting in updated criteria; and distributing the updated criteria to the node.

3. The non-transitory machine-readable medium of claim 1, wherein the operations further comprise:

subsequent to the distributing of the criteria, determining that an update to the criteria is warranted based on a decommissioning of a second resource from a pool of available resources, the pool of available resources including the at least one resource;

based on the determining, updating the criteria, resulting in updated criteria; and distributing the updated criteria to the node.

4. The non-transitory machine-readable medium of claim 1, wherein the operations further comprise:

subsequent to the distributing of the criteria, determining that an update to the criteria is warranted based on a modification to the at least one resource;

based on the determining, updating the criteria, resulting in updated criteria; and distributing the updated criteria to the node.

5. The non-transitory machine-readable medium of claim 1, wherein the operations further comprise:

subsequent to the distributing of the criteria, determining that an update to the criteria is warranted based on a modification to a second resource of a pool of available resources, the pool of available resources including the at least one resource;

based on the determining, updating the criteria, resulting in updated criteria; and distributing the updated criteria to the node.

6. The non-transitory machine-readable medium of claim 1, wherein the operations further comprise:

subsequent to the distributing of the criteria, determining that an update to the criteria is warranted based on a modification of a feature of the at least one service;

based on the determining, updating the criteria, resulting in updated criteria; and distributing the updated criteria to the node.

7. The non-transitory machine-readable medium of claim 1, wherein the first criteria are based on a first level of criticality of the at least one service relative to a second level of criticality of a third service, the second level of criticality being different from the first level of criticality.

8. The non-transitory machine-readable medium of claim 1, wherein the at least one resource performs signal reconditioning on a signal.

9. The non-transitory machine-readable medium of claim 8, wherein the signal is a first optical signal.

10. The non-transitory machine-readable medium of claim 9, wherein the signal reconditioning includes a conversion of the first optical signal to a first electrical signal and a conversion of a second electrical signal to a second optical signal, the second electrical signal being based on the first electrical signal.

11. The non-transitory machine-readable medium of claim 1, wherein the at least one resource is utilized by the restoration path as a result of a degradation in a quality of the at least one service as part of a work path.

12. The non-transitory machine-readable medium of claim 11, wherein the work path includes a link, the link including a fiber medium.

13. A device comprising:

a first processing system including a first processor; and memory storing instructions that, when executed by the first processing system, facilitate a performance of operations, the operations comprising:

obtaining first criteria that identifies a first service that is entitled to utilize a resource;

obtaining a first request from a second processing system including a second processor supporting a service to utilize the resource, the first request including a first identifier of the service and a second identifier of the resource;

comparing the first identifier and the second identifier to the first criteria;

determining, based on the comparing, that the service corresponds to the first service and the service is entitled to utilize the resource; and based on the determining, allocating the resource to a first restoration path associated with the first service.

14. The device of claim 13, wherein the operations further comprise:

based on the allocating, transmitting a message, a signal, a report, or any combination thereof, that indicates that the resource has been allocated.

15. The device of claim 13, wherein the operations further comprise:

subsequent to the allocating, obtaining a second request for a second service to utilize the resource;

based on the obtaining of the second request, determining that the resource is allocated; and based at least on the determining that the resource is allocated, denying the second request.

16. The device of claim 13, wherein the operations further comprise:

subsequent to the allocating, obtaining a second request for a second service to utilize the resource, wherein the second service is entitled to utilize the resource in accordance with the first criteria;

based on the obtaining of the second request, determining that the second service has a higher priority than the first service in terms of a utilization of the resource; and based on the determining that the second service has the higher priority than the first service in terms of the utilization of the resource, reallocating the resource to a second restoration path associated with the second service.

17. The device of claim 13, wherein the operations further comprise:

subsequent to the allocating, obtaining a second request from the second processing system to release the resource; and based on the obtaining of the second request, releasing the resource from the allocation to the first restoration path.

18. A method, comprising:

determining, by a processing system including a processor, that a quality of service associated with a first path between a first node and a second node of a communication system is less than a threshold, resulting in a first determination;

identifying, by the processing system and based on the first determination, a resource for rerouting at least a portion of data associated with a service that utilizes the first path along a second path between the first node and the second node, wherein the resource is managed by a third node interposed between the first node and the second node;

determining, by the processing system and based on the identifying, that the service is eligible to utilize the resource as part of the second path, resulting in a second determination; and causing, by the processing system and based on the second determination, the at least a portion of the data to be routed from the first node to the second node using the second path.

19. The method of claim 18, wherein the quality of service associated with the first path being less than the threshold is based on an inoperability of a fiber link between the first node and the second node, the method further comprising:

determining, by the processing system and based on the second determination, that the resource is unallocated, resulting in a third determination, wherein the causing is further based on the third determination.

20. The non-transitory machine-readable medium of claim 1, wherein the distributing of the criteria to the node of the network causes the node to deny a request from a second node for access to the at least one resource based on a determination that the at least one resource is already occupied at a time of the request.

* * * * *